United States Patent
Meuleman et al.

(10) Patent No.: US 11,263,910 B2
(45) Date of Patent: Mar. 1, 2022

(54) VERY LOW LEVEL OPERATIONS COORDINATION PLATFORM

(71) Applicant: UNIFLY N.V., Antwerp (BE)

(72) Inventors: Koen Meuleman, Horebeke (BE); Andres Van Swalm, Antwerp (BE); Koen Williame, Edegem (BE)

(73) Assignee: UNIFLY N.V., Antwerp (BE)

(*) Notice: Subject to any disclaimer, the term of this patent is extended or adjusted under 35 U.S.C. 154(b) by 193 days.

(21) Appl. No.: 16/081,995

(22) PCT Filed: Mar. 5, 2017

(86) PCT No.: PCT/EP2017/055108
§ 371 (c)(1),
(2) Date: Sep. 4, 2018

(87) PCT Pub. No.: WO2017/149160
PCT Pub. Date: Sep. 8, 2017

(65) Prior Publication Data
US 2019/0172357 A1    Jun. 6, 2019

(30) Foreign Application Priority Data
Mar. 4, 2016 (BE) .................................. 2016/5163

(51) Int. Cl.
| | | |
|---|---|---|
| G08G 5/00 | (2006.01) | |
| H04W 4/44 | (2018.01) | |
| H04W 4/029 | (2018.01) | |
| G06F 16/909 | (2019.01) | |
| B64C 39/02 | (2006.01) | |
| G05D 1/10 | (2006.01) | |

(52) U.S. Cl.
CPC ........... *G08G 5/006* (2013.01); *B64C 39/024* (2013.01); *G05D 1/101* (2013.01); *G06F 16/909* (2019.01); *G08G 5/0034* (2013.01); *G08G 5/0039* (2013.01); *G08G 5/0069* (2013.01); *G08G 5/0078* (2013.01); *H04W 4/029* (2018.02); *H04W 4/44* (2018.02); *B64C 2201/12* (2013.01); *B64C 2201/145* (2013.01); *B64C 2201/146* (2013.01)

(58) Field of Classification Search
CPC .... G08G 5/006; G08G 5/0034; G08G 5/0039; G08G 5/0069; G08G 5/0078; H04W 4/44; H04W 4/029; G06F 16/909; B64C 39/024; B64C 2201/12; B64C 2201/145; B64C 2201/146; G05D 1/101
See application file for complete search history.

(56) References Cited

U.S. PATENT DOCUMENTS

| | | | | |
|---|---|---|---|---|
| 2014/0257692 A1* | 9/2014 | Stefani | ................... | G01C 21/00 701/519 |
| 2015/0336669 A1* | 11/2015 | Kantor | ................ | G08G 5/0013 701/3 |
| 2016/0062363 A1* | 3/2016 | Fengler | ................ | G05D 1/0055 701/8 |

FOREIGN PATENT DOCUMENTS

| | | |
|---|---|---|
| DE | 102014217196 A1 | 3/2016 |
| EP | 2908202 A1 | 8/2015 |

OTHER PUBLICATIONS

International Search Report in related PCT/EP2017/055108, dated Jun. 7, 2017.
Written Opinion in related PCT/EP2017/055108, dated Jun. 7, 2017.
Second Written Opinion in related PCT/EP2017/055108, dated Mar. 28, 2018.
International Preliminary Report on Patentability in related PCT/EP2017/055108, dated Jun. 21, 2018.
DJI: "DJI Introduces New Geofencing System for its Drones", dji.com, Nov. 18, 2015, retrieved from the Internet: URL: https://www.dji.com/newsroom/news/dji-fly-safe-system, retrieved Mar. 16, 2018, four pages.
Extended Search Report for corresponding BE2016/05163 dated Feb. 7, 2017.

* cited by examiner

*Primary Examiner* — Geepy Pe
*Assistant Examiner* — Bakari Underwood
(74) *Attorney, Agent, or Firm* — Hamre, Schumann, Mueller & Larson, P.C.

(57) ABSTRACT

A Very Low Level Operations Coordination Platform and a method of operating it, that includes a cloud-based software platform that serves as a central database application for drone-related applications, the central database application including a database storing any, some or all zones which defines where drones are and are not allowed to fly based on all required information such as but not limited to drone legislation, airspace structure, obstacles, environment and people density, taking into account scheduled flights, planned flights and flights flown of other drones, where if the drone fails to remain within the approved fly zone the platform is adapted to proactively intervene in flight operations so that the drone cannot leave the approved fly zone.

19 Claims, No Drawings

VERY LOW LEVEL OPERATIONS COORDINATION PLATFORM

The present application relates to systems and methods of approving and controlling drone flights, to drones themselves and to apps for use with smart phones for visualizing the drone operations.

BACKGROUND OF THE INVENTION

Drones relate to an unmanned aircraft systems (UAS), e.g. unmanned aerial vehicles (UAV). In this application the terms drone and unmanned aerial vehicle system are considered to be synonymous. The flight of UAS or UAV may be controlled with various kinds of autonomy: either by a given degree of remote control from an operator, located on the ground or in another system, or fully autonomously, by on-board computers.

'Flyaways' of drones have been reported which happen when a drone either loses contact with its pilot or simply flies away inexplicably, with the failsafe, which is supposed to return the drone to "home" in case of failure, also malfunctioning.

Manufacturers say flyaways are caused by user error, drone-owners usually say it's a manufacturer defect. Others blame it on lack of training of the pilots. One problem is that small drones often offer a very limited flight time—usually tens of minutes with a limited effective control distance of a few hundred meters. The ability of drones to fly far beyond the visual range of the pilot and at an altitude that might concern manned flight or cause danger to persons and property on the ground causes concern. There are a number of safety measures that have been utilized such as avoiding flying above populated areas or at altitudes where manned aircraft are likely to be present, and utilizing autopilots with "Return to Home" capability which automatically fly the aircraft back to the pilot in the event of a signal loss.

For instance, an on-board global navigation system (GNS) such as an on-board global positioning system (GPS) can be provided and the system will automatically trigger the "Return to Home" procedure and should land safely when the communication between the main controller and the transmitter is lost. Where this "Go Home" function is an opt-in function and not an opt-out one, the pilot can forget to enable it. Further, due to the limited flight time, a drone must activate the return-to-home early enough to reach home.

Others argue that the 2.4 GHZ band used by many small drones for the connection between the ground transmitter and drone is too crowded. This band is used by many devices such as computer wireless networks, model vehicles, baby monitors to name a few. This can cause problems when an area has dense housing and/or office buildings with many interfering wireless signals. A drone can also interfere with its own on-board systems when it has two separate systems, one for control of the drone and one for transmitting the video or images from an on-board camera. First-person view (FPV) or remote-person view (RPV), relates to video piloting to control a drone from the pilot's view point. The vehicle system has an on-board camera whose output is fed wirelessly to a video monitor. Some designs include a pan-and-tilt gimbaled camera controlled by a gyroscope sensor in the pilot's monitor. With dual on-board cameras a true stereoscopic view can be obtained. However, transmitting video streams requires a significant wireless bandwidth and excellent reception, i.e. a low level of interference.

Although drone owners might think that they provide a vital monitoring function of events such as riots, major accidents, criminal or terrorist attacks and demonstrations, the security forces attempting to respond to such disturbances do not want potential drone threats in their area of operations. Drones have already been shot down by police in such situations. If bona fide journalists begin to use drones to carry out their reporting function, or if the security forces wish to use such drones for surveillance it would be necessary to know whether a drone entering such an area is licensed to observe such events or not. Due to the fact that such events may develop in minutes a safe fly zone can become a no-fly-zone within a drone's flight time. Also weather conditions may change rapidly resulting in flying conditions becoming impossible for a drone in certain areas.

On the other hand there is a considerable interest in the commercial use of drones. Amazon has announced its "Prime Air" which is a future delivery system to get packages to customers in 30 minutes or less using small unmanned aerial drones. Putting Prime Air into service is said to require regulatory support. Delivery of medication to remote areas has also been suggested.

One issue is the range of different users of drones or those affected by them, such as private users for recreation, professional users, police, aviation authorities, aviation control and air traffic management, manufacturers of drones, software houses and system builders. There is therefore potentially a very large number of users or interested parties, most of whom have no background knowledge of aviation. Another issue is that most drones are not equipped with sophisticated controls and fly at a height where they cannot be detected by ground radar as used by air traffic control for manned flight.

There are restrictions on drone use in built up areas, controlled airspace reserved by air traffic control and airspace for specific air activities.

The current air traffic control systems cannot be used to check drone activity at low altitude. If there are a large number of proprietary systems it is impractical for interested parties to identify and monitor all of them. Low altitude airspace is used by manned aircraft, such as police helicopters. This is a dangerous situation in which the consequences are incalculable on a potential collision.

While manned flight paths are publically available, as are approved airfields or heliports, drone operations could be anywhere. This causes a serious inspection difficulty. This lack of monitoring ability means that there is a problem to distinguish between illegal and legal activities.

Drone activities also raise privacy questions especially with on-board cameras. The aviation industry is one of the most demanding and stringently regulated industries that exist and this is essential in order to guarantee maximum safety. This is the result of constant evolution that lasted for a hundred years. Therefore, it is an unprecedented challenge to integrate drone activities in a secure way in the existing air space. If drone activities are made available to the general public then pilots may not be aware of the dangers and are often unfamiliar with aviation regulations. Pilots of manned aircraft have to go through an extended training, examination and review process to obtain a pilot's license. An equivalent training for drones would be excessively expensive. If the drone pilot license and insurance requirements were to vary from country to country this would make co-ordination at an international level difficult.

SUMMARY OF THE INVENTION

In a first aspect of the present invention a Very Low Level Operations Coordination Platform is provided comprising a cloud-based software platform that serves as a central database application for drone-related applications, the central database application comprising a database storing any, some or all of airspace structure, drone legislation, system information of drones, data identifying drone users, no-fly-zones, scheduled flights, planned flights and flights flown, wherein if a drone fails to remain within reserved airspace the platform is adapted to proactively intervene in flight operations so that the drone cannot leave the reserved airspace.

In general, as used in embodiments of the present invention, geographic zones are defined. Hence a Very Low Level Operations Coordination Platform can comprise a cloud-based software platform that serves as a central database application for drone-related applications, the central database application comprising a database storing any, some or all geographic zones. The Platform defines where drones are and are not allowed to fly based on all required information such as but not limited to drone legislation, airspace structure, obstacles, environment and people density, taking into account scheduled flights, planned flights and flights flown of other drones, wherein if the drone fails to remain within the approved fly zone the platform is adapted to proactively intervene in flight operations so that the drone cannot leave the approved fly zone.

A platform can include:

The drones themselves. As drone capability needs to be matched to platform requirements the drones are an integral part of the platform.

Hardware including embedded systems. Embedded systems can access hardware directly, with or without an operating system.

A browser functionality in the case of web-based software. Although a browser itself can run on a computer comprising hardware, memory, a processing engine and an operating system this is need not relevant to software running within the browser.

A computer application can host software written in an application-specific scripting language. Software can be provided for ready-made functionality.

A platform can include cloud computing and can provide a service. A software framework can be linked by internet communication, for example or can be enabled to have direct communication with a drone, e.g. via wireless communication which can be a public wireless communication such as a cellular wireless system. Alternatively direct communication with a drone can be by a private wireless communication system.

A platform may use a virtual machine (VM) such as the Java virtual machine or .NET CLR. Applications are compiled into a format similar to machine code, known as bytecode, which is then executed by the VM, e.g. on-board.

A virtualized version of a complete system, including virtualized hardware, OS, software and storage. These allow, for instance, a typical Windows program to run on what is physically a Mac.

A platform can have multiple layers, with each layer acting as a platform to the one above it. In general, a component only has to be adapted to the layer immediately beneath it.

In a further aspect of the present invention a drone is provided, having a processor on-board as well as basic systems required to communicate with a cellular mobile telephone system or other wireless networks (e.g. Sigfox, LoRa, Iridium) including antennas, one or more processors, transceivers for transmission and reception, being able to register on any available network, location update and the transmission and reception of the short message service.

In a further aspect the present invention provides a method of Very Low Level Operations Coordination comprising the steps of:

Maintaining a central database application for drone-related applications. For example the central database application can comprise a database storing any, some or all zones which defines where drones are and are not allowed to fly based on all required information such as but not limited to drone legislation, airspace structure, obstacles, environment and people density, taking into account scheduled flights, planned flights and flights flown of other drones, wherein if the drone fails to remain within the approved fly zone the platform is adapted to proactively intervene in flight operations so that the drone cannot leave the approved fly zone. For example, the central database application can comprise a database storing any, some or all of airspace structure including reserved spaces for drones to fly in, drone legislation, system information of drones, data identifying drone users, no-fly-zones, scheduled flights, planned flights and flights flown, wherein if a drone fails to remain within reserved airspace the platform is adapted to proactively intervene in flight operations so that the drone cannot leave the reserved airspace. By providing reserved spaces for drones the danger of collisions with other aircraft is reduced.

DESCRIPTION OF THE INVENTION

The present invention will be described with respect to particular embodiments but the invention is not limited thereto but only by the claims.

In one embodiment the present invention provides an open, cloud-based software platform that serves as a central database application for Drone-related applications. In addition to the airspace structure and available Drone legislation the database can contain system information of Drones, Drone Users, Scheduled flights, obstacles, planned flights and flights flown. For example, a central database application can comprise a database storing definitions of any, some or all zones. The central database application can define where drones are and are not allowed to fly based on all required information such as but not limited to drone legislation, airspace structure, air space reserved for drones, obstacles, environment and people density, taking into account scheduled flights, planned flights and flights flown of other drones, The system is adapted to prevent conflicts between drones users and between drone users and manned aircraft and to ensure that a drone operator can determine automatically or manually whether their planned flights can proceed within the legal framework and without conflicts with other planned and unplanned operations of other users such as planned or unplanned drone flights. The system can be configured to inform drones, drone users or drone operators of a conflict and to deconflict them, especially with respect to potential conflicts from manned aircraft.

The system can be used by different types of users. For each type of customer, there is another interface with custom functionality: private users, professional users, police, aviation authorities, aviation control, air traffic management, manufacturers of drones, software houses and system builders.

In addition to airspace structure defining and recording the information where drones are and are not allowed to fly, the system preferably contains data from drones, drone users, scheduled flights, flights in progress and already implemented.

Embodiments of the present invention provide the central database platform as part of a Very Low Level Operations Coordination (VLLOC) platform. This platform serves as a portal for anyone and everyone who takes part in drone operations. The system is applicable to drones that operate at low altitudes, e.g. below the heights at which conventional radar can monitor aircraft. It includes a passive and/or active monitoring system including coordination of drone information and drone operations of all parties.

In some embodiments the VLLOC platform can consist of two main parts, namely a database with services that can collect and/or can distribute information to drone operators and a component that visualizes the drone activities and coordinates, obstacles and other relevant information.

The database can store all relevant business and contact information of a drone operator. Additionally, this database can be used to distribute information on all zones or all relevant zones where drones are allowed to fly. Such information can be made available or shared with any some or all of the police or other security organisations, security services, emergency services and aviation authorities. The database can log drone pilot licenses, insurance certificates, loggings of past and planned flights and other official documents that are important to be stored for drone operations.

This database is associated with a component which visualizes all drone operations. The drone operator indicates a pilot who will be flying drones, as well as where and when these flights will take place. To determine whether a drone flight is or is not allowed to fly an application procedure will be started. This procedure consists of the automated validation of the applicable validation processes. This validation process will be determined separately for each country and will be an analysis of the applicable legislation. The drone operator knows in this way whether he is or isn't allowed to fly at the indicated place, or what regulations he has to meet in order to be allowed to fly. Flights will be deconflicted from other drone flights through an online system of the VLLOC platform. Flight approval for the drone flight is achieved by submitting the intended fly zone, speed and direction of flight in near-real time. When the flight is approved a digital flight information exchange model such as NOTAM, AXIM (Aeronautical Information Exchange Model), FIXM (Flight Information Exchange Model) or similar will be published. With this, the VLLOC platform has all the information in order to determine whether the drone will leave an approved fly zone or an airspace reserved or allowed for drones.

Embodiments of the present invention preferably provide a VLLOC platform using Geo-caging, i.e. the principle that a drone can only use an airspace reserved zone, or an approved zone for its operations. These operations cannot take place outside of this zone. Geo-caging controls, on the basis of reserved airspace, any planned flight of a drone. The drone operations must take place within this airspace reserved or approved zone. Failure to do so can result in the VLLOC platform proactively interfering in flight operations so that the drone does not leave the airspace reservation or approved zone. The VLLOC platform can control the drone in three dimensions if the drone intends to leave the reserved airspace, e.g. by connecting with an on-board autopilot function and transmitting commands thereto.

To execute a successful flight operation an application process must meet all validation processes as required by the applicable drone regulation and/or zone regulation, such as confirmation of the pilot or operator identity, drone(s) to be used for the operation, the intended fly zone (e.g. horizontal and vertical dimensions), timings of the operation, whether there is an operational conflict, e.g. with other planned or unplanned drone flights or that there will be no intrusion with a no-fly zone. A flight is approved only if all of these requirements are met. This could be done automatically by the platform according to embodiments of the present invention if all conditions are met or if needed, a manual escalation process will take place where additional interactions will be required (i.e. approval process) in case the application was not in line with the prescribed initial flight constraints. The logging of this information in the database for each flight means that all interested parties are informed of and are managing all drone activities. Other information can be logged such as operator cell phone number, an Operation name, an Operation type, whether Air traffic control services have been informed, etc. The competent authorities can intervene if necessary, by contacting the drone pilot or operator, e.g. via the stored operator cell phone number. They may also, if necessary, restrict or limit areas or zones. Police may also have access to request data and see if an operator is operating legally. Emergency services, Federal Police (Service Air Support) and Defense, can also be provided with access to this database because they are often operating helicopters flying at a very low altitude. The local authorities may also impose limits but provide exceptions through the system that can be enforced by the police in their turn. Third parties may make requests to see if their privacy has or will be infringed.

To ensure safety, all drone operators must be aware of where others will fly so they can coordinate in advance to avoid collisions. The VLLOC platform according to embodiments of the present invention can also use external data to provide additional awareness information, for example EAD (European AIS Database), eTOD (Electronic Terrain and Obstacle Data), Meteorological data, ADS-B (Automatic Dependent Surveillance-Broadcast).

An exemplary embodiment of a drone operative system is as follows. Each drone has a processor on-board as well as the basic systems required to communicate with a telecommunications network, e.g. components required to communicate with cellular mobile telephone systems including on-board antennas, a transceiver for transmission and reception, being able and adapted to register on any available telecommunication system, to perform a location update and the transmission and reception of the short message service. The processor is adapted to receive a message such as a message in any format sent over a network such as a message from a Short Message Service (SMS) and extract and parse the alphanumeric data and process it. The drone will have a mobile telephone number that it can access and transmit data to. This telephone number is monitored by the VLLOC platform. The drone will also have RAM and non-volatile memory. The non-volatile memory will store geographic data such as non-fly-zones, approved zones, reserved zones as well as zones with a height restriction or other restrictions like no use of cameras (privacy restrictions). The memory will also store a planned and approved flight plan and any passwords that are required. The processor will be programmed to carry out any authentication or access algorithms, data compression and decompression algorithms, encryption and decryption algorithms and telecommunication codecs to allow communications with a telecommunication network such as a wireless network including a cellular wireless network.

The drone will be able to monitor its location. For example it can have a global navigation satellite system (GNSS) receiver such as a Global Position System (GPS) receiver and the processor can operate on the received data from the satellites to determine position on the ground, speed over ground and height. Alternatively or additionally it can determine its position using the cellular wireless telephone system or any other wireless network. One method of determining the location of such as drone is by the Cell ID. A geographical area for a wireless cellular communications system is generally divided into separate radio coverage areas or cells. Generally a base station is located in each cell and a drone configured as a mobile user can communicate with one or more base station transceivers located in one or more cells. Several cells may be grouped together and referred to as a location area. If the drone leaves a location area it will register itself with the new location area via the cell in which it is currently located by Location Updating. Both location areas and base stations generally have an identifier such as a Location Area Identifier and a Base Station Identifier which are generally transmitted on a common signalling channel. Location updating causes updating of subscriber data of drone in a subscriber database. Hence, the location updating procedure results in a location of each drone that has accessed the system being recorded.

Other methods of location are known including the measurement of signal strength received by the drone, reports of time differences between transmissions from different base stations, reports on synchronisation or other network information, paging messages which contain geographic data. The drone can support mobile based position location methods in which the cellular network provides information for the drone to locate itself autonomously.

Geographic data can be transmitted to the drone via a message in any format over the network in the form of geographic co-ordinates. An example may the latitude and longitude of a point or a set of latitudes and longitudes which define an area, e.g. a set of three for a triangle, a set of four for a square oblong, parallelogram, or similar polygon. Alternatively, the latitude and longitude of a point is specified with an additional distance. The distance defines the radius of a circle having its centre as the specified point. This allows an update to the drone of a change in the geographic co-ordinates of no-fly-zones. This allows dynamic adaptation of the non-fly-zones as can happen because of a change in weather or disasters, accidents, or criminal attacks etc. Once received the drone will update its database and will confirm the update by a sending a confirmation message. One method of confirming an update is to create a hash of the updated database which is transmitted by e.g. SMS or any other transmitted message to the VLLOC platform where it can be checked for accuracy.

One important activity is the control of developing emergency situations dynamically during a drone flight. Helicopters are used by the police, armed services and hospitals which fly at low altitudes at unplanned times along unplanned routes. The VLLOC platform has a record of the flight path of any drone. It can also receive location updates through transmitted data messages as indicated above. Thus the VLLOC platform can liaise with emergency services to detect potential conflicts with helicopter flights or any other airborne missions. Helicopter accidents are particularly serious as there is no safe way of ejecting from a helicopter. Positions and flight paths of helicopters can be sent to the drone via a message in any format over a network e.g. a message provided by a SMS or any other messaging system and instructions to move left, right, up, down can be transmitted to the drone from the VLLOC platform using the messaging service. The on-board processor is adapted to parse such a message and to extract the commands.

The VLLOC platform according to embodiments of the present invention may also be adapted to prevent a drone taking off if the flight is not approved. For example the drone may require a "golden key" before it may start. If the drone does not receive an appropriate digital golden key the processor on-board the drone is able to prevent operation of the flight controls and the engine. The digital golden key may be an alphanumeric code that is received by the drone via a e.g. SMS message or other transmitted message over a wireless network. The digital golden key may be created by any suitable encryption system, e.g. one that relies on exchanged or random numbers, challenges etc.

The drone can have its own on-board energy storage such as a batteries and/or ultracapacitors. The drone may also include solar cells as a power source, e.g. a source that can maintain processor activity even after a forced landing or accident. In this way the position of the drone can be determined at all times that the drone is in contact with the cellular mobile phone system or wireless network. Mobile phone location systems or wireless network location systems are presently available from several suppliers and thus the drone can be located even after it has crash landed.

Use of the mobile phone system or other wireless network also allows so-called "apps" to be installed on a smart phone which allows location finding of the drone as the drone will have a mobile telephone number, as well as checks on the present state of reserved zones, approved zones, no-fly-zones and/or weather problems.

Drones may also include active or passive identifiers. One example is a passive identifier that can receive energy from a wireless source and then emit a signal, e.g. the drone may make use of a passive RFID tag. The drone may make use of a wireless identification and sensing platform which comprises an RFID (radio-frequency identification) device that supports sensing and computing: a microcontroller powered by radio-frequency energy. The tag is powered and read by an RFID reader. The tag harvests the power that it uses from the reader's emitted radio signals or any other signals. The harvested energy operates a general purpose microcontroller. The microcontroller can perform a variety of computing tasks, including sampling sensors, and reporting that sensor data back to the RFID reader. Such a device can be used by the police and security forces if a drone flies into a no-fly-zone designated by the police and security forces. By firing sufficient radio frequency energy at the drone the tag will react and emit a signal such as an AIS (Automatic Identification System) identifier. The police and security forces on the ground can then see if the drone as the required clearance to fly in such a drone. If not the police and security forces can take action, e.g. in an extreme case fire on the drone and destroy it, or send a request to the VLLOC platform requesting the removal of the drone in question within so many seconds. The police or security services can use the microcontroller of the wireless identification and sensing platform to initiate a return-to-home action which will take the drone out of the relevant area.

A drone can have additional equipment such as any of, some of or all of a gyroscope, an accelerometer, a compass, a camera, two cameras that provide stereoscopic imaging, still or video cameras, hyperspectral camera, a thermometer, an infrared or an ultraviolet sensor, a radar emitter and/or receiver, a microphone, an ultrasound emitter and/or receiver, a chemical sensor such as an air pollution sensor, a Geiger counter, a biological sensor, an air speed sensor, navigation lights, audible or visible alarms. These devices may be coupled together in a CAN. The on-board processor can access any of these devices to retrieve data or to make them operate by executing commands. Any such data can be transmitted via e.g. SMS messages or messages from any other wireless system to the VLLOC platform. Such information can include the heading of the drone, speed over ground, air speed, height above ground etc.

A drone can be provided with a space for holding and a releasable holding device for a payload e.g. for holding a post package, a box of medical supplies, emergency rations, etc. A drone can be provided with an antenna and a receiver for satellite communications and telemetry including GNSSS signals such as GPS signals.

Drones for use with embodiments of the present invention providing a VLLOC platform are preferably adapted to work with the platform such that drones are a part of the overall VLLOC platform. Zones can be defined by constraints which are to apply in each zone. Drones for use with embodiments of the present invention are preferably adapted to be able to operate with embodiments of the present invention providing a VLLOC platform. Zones can have restrictions and constraints and the drones for use with the platform are modified technically to match these restrictions and constraints.

Examples are:

Allowed airspeed in a zone can be determined by the class of drones or by local zone limitations. Drones can be equipped with on-board airspeed measuring devices. There are several types of airspeed indicators well known in the art for example pilot tube systems using total and static pressure measurements. Another type of flow speed measurement system is known as vane and cup anemometers. Another type of sensor system uses multi-element hot-wire or hot film anemometry. These sensors can provide good frequency response but they are usually fragile, sensitive to temperature changes and require accurate and repeated in-situ calibration for satisfactory performance.

Speed over ground can be determined by information from an on-board GNSSS or GPS transceiver.

Allowed safe wind speed in a zone can be determined by the class of drones or by local zone limitations. If the wind speed of a headwind exceeds the maximum airspeed of the drone, the drone will go backwards and cannot stay on its route. Wind speed can be provided by ground based systems such as airfields and meteorological stations. Wind speed can be transmitted to a drone via a wireless short message, e.g. from the platform. The wind speed can also be determined by a suitably programmed on-board processor from the difference between the measured airspeed and the speed over the ground.

Drones may be limited to a certain height over ground. This can be determined from information from an on-board GNSSS or GPS transceiver. It can also be determined by an on-board radar time of flight system.

Drones can be equipped with a "heartbeat"—a wireless message that is sent out regularly to indicate that communication between the drone and the ground based VLLOC platform. If a heartbeat is not received by the ground based VLLOC platform, an emergency sequence can be initiated, e.g. a signal is sent out from various cells (locally, e.g. within 15 km of the last reported position of the drone for example) including a command to send out a heartbeat. If a heartbeat is now not received a signal is sent out from various wireless cells (locally, e.g. within 15 km of the last reported position of the drone for example) for the drone to land and to send out a heartbeat. If a heartbeat is now not received a signal is sent out from various wireless cells (locally, e.g. within 15 km of the last reported position of the drone for example) for the drone to "return to base immediately".

Drones can be equipped with a number of solid state radar transmitters and receivers and the processor can be adapted to determine distances to other objects like obstacles or other aircraft and to determine the speed of these objects by Doppler radar techniques. The processor can be adapted to extrapolate or interpolate measured distances to determine if the object is on a collision course.

The invention claimed is:

1. A Very Low Level Operations Coordination Platform comprising a cloud-based software platform that serves as a central database application for drone-related applications, the central database application comprising a database storing any, some or all of airspace structure, drone legislation, system information of drones, data identifying drone users, no-fly-zones, scheduled flights, planned flights and flights flown, the airspace structure including reserved zones, approved zones, no-fly-zones for drones,
wherein if an airborne drone intends to not remain within a reserved airspace, the Very Low Level Operations Coordination platform is adapted to proactively intervene in flight operations so that the airborne drone cannot leave the reserved airspace, the Very Low Level Operations Coordination platform being adapted to communicate with the airborne drone via a cellular wireless network, wherein the Very Low Level Operations Coordination platform is adapted to transmit instructions to the airborne drone to move left, right, up, down, using a messaging service over the cellular wireless network, an on-board processor on the airborne drone being adapted to parse such a message and to extract commands therefrom and to control the airborne drone in three dimensions if the airborne drone intends to leave the reserved airspace, by connecting with an on-board autopilot function and transmitting the commands thereto, the cellular wireless network providing location finding of the airborne drone, as well as updates on a present state of said reserved zones, said approved zones, said no-fly-zones and/or weather problems.

2. The coordination platform according to claim 1, wherein the airborne drone has basic systems required to communicate with the cellular wireless network including antennas, transmission and reception, being able to register on any available network, to provide a location update and transmission and reception of the message of the messaging service over the cellular wireless network.

3. The coordination platform according to claim 1, wherein said on-board processor on the airborne drone is adapted to receive instructions from the Very Low Level Operations Coordination platform using the messaging service over the cellular wireless network by receiving the message and adapted to extract alphanumeric data therefrom and to and process it.

4. The coordination platform according to claim 1, wherein the airborne drone has a global navigation satellite system (GNSS) receiver or a global positioning satellite receiver for location finding.

5. The coordination platform according to claim 1, wherein the airborne drone is adapted to receive geographic data transmitted to the airborne drone via a short message service (SMS) message or any other wireless messaging service over the cellular network.

6. The coordination platform according to claim 2, wherein the airborne drone is adapted to update an on-board database on the airborne drone and to confirm the update by a short message service (SMS) message or any other messaging service over the cellular network.

7. The coordination platform according to claim 1, wherein the Very Low Level Operations Coordination platform has a record of the flight path of any drone, and receives location updates of the position of any drone.

8. The coordination platform according to claim 5, wherein the Very Low Level Operations Coordination platform is adapted to receive flight plans of helicopter flights and to determine if there is a conflict between any helicopter flight plan and a drone flight plan and/or position and/or heading.

9. A drone for use in an airspace structure having reserved zones, approved zones, no-fly-zones, having an on-board processor as well as basic systems required to communicate with a cellular mobile system including antennas, a transceiver for transmission and reception, being able to register on any available network, and to obtain location updates and transmission and reception of a message from a messaging service over the cellular mobile system, wherein the cellular mobile system is a cellular mobile telephone system,
wherein the drone is configured so that if the drone intends to leave a reserved airspace, the drone is configured to receive the message using the messaging service over the cellular mobile system with instructions for the drone to move left, right, up, down, the drone on-board processor being adapted to parse the message and to extract commands therefrom and to control the drone in three dimensions if the drone intends to leave the reserved airspace, by connecting with an on-board autopilot function and transmitting commands thereto, the drone being adapted to receive location finding of the drone, as well as updates on a present state of said reserved zones, said approved zones, said no-fly-zones and/or weather problems via the cellular mobile system.

10. The drone according to claim 9, wherein the on-board processor is adapted to receive a short message service (SMS) message or any other transmitted message and extract alphanumeric data therefrom and to and process it.

11. The drone according to claim 9, wherein the drone has a global navigation satellite system (GNSS) receiver or a global positioning system (GPS) receiver.

12. The drone according claim 9, wherein the drone is adapted to determine its position using the cellular mobile telephone system.

13. The drone according to claim 10, wherein the drone is adapted to receive geographic data transmitted to the drone via the messaging service.

14. The drone according to claim 10, wherein the drone is adapted to update an on-board database and to confirm the update by a short message service message or any other wireless messaging service of the messaging service over the cellular network.

15. A method of Very Low Level Operations Coordination comprising the steps of:
maintaining a Very Low Level Operations Coordination platform having a central database application for drone-related applications, the central database application comprising a database storing any, some or all of airspace structure, the airspace structure including reserved zones, approved zones, no-fly-zones for drones, drone legislation, system information of drones, data identifying drone users, the reserved zones, approved zones, no-fly-zones, scheduled flights, planned flights and flights flown,
wherein if an airborne drone intends not to remain within a reserved airspace, the Very Low Level Operations Coordination platform is adapted to proactively intervene in flight operations so that the airborne drone cannot leave the reserved airspace, by communicating a message to the airborne drone via a messaging service over a cellular wireless network, the message including instructions from the Very Low Level Operations Coordination platform via the cellular wireless network for the airborne drone to move left, right, up, down, an on-board processor on the airborne drone parsing the message and extracting commands therefrom,
wherein the Very Low Level Operations Coordination platform is adapted to control movement of the airborne drone in three dimensions if the airborne drone intends to leave the reserved airspace by connecting with an on-board autopilot function and transmitting the commands thereto, the airborne drone receiving location finding of the airborne drone, as well as updates on a present state of said reserved zones, said approved zones, said no-fly-zones and/or weather problems from the cellular wireless network.

16. The Very Low Level Operations Coordination platform according to claim 1, wherein the on-board processor on the airborne drone is adapted to parse the message and to extract commands therefrom and to control the airborne drone in three dimensions if the airborne drone intends to leave an approved space.

17. The Very Low Level Operations Coordination platform according to claim 1, wherein the on-board processor on the airborne drone is adapted to parse the message and to extract commands therefrom and to control the airborne drone in three dimensions if the airborne drone intends to enter a no-fly zone.

18. The method according to claim 15, wherein the on-board processor on the airborne drone is adapted to parse the message and to extract commands therefrom and to control the airborne drone in three dimensions if the airborne drone intends to leave an approved space.

19. The method according to claim 15, wherein the on-board processor on the airborne drone is adapted to parse the message and to extract commands therefrom and to control the airborne drone in three dimensions if the airborne drone intends to enter a no-fly zone.

* * * * *